United States Patent [19]

Knop et al.

[11] Patent Number: 4,812,913
[45] Date of Patent: Mar. 14, 1989

[54] DIAPHRAGM ARRANGEMENT FOR OPTO-ELECTRONIC SCANNING OF ORIGINALS

[75] Inventors: Hans-Georg Knop; Jörg Schulz-Hennig, both of Heikendorf, Fed. Rep. of Germany

[73] Assignee: Dr. Ing. Rudolf Hell GmbH, Fed. Rep. of Germany

[21] Appl. No.: 147,321

[22] Filed: Jan. 22, 1988

[30] Foreign Application Priority Data

Jan. 24, 1987 [EP] European Pat. Off. ........ 87100998.1

[51] Int. Cl.⁴ ............................................. H04N 1/04
[52] U.S. Cl. .................................... 358/285; 358/294; 350/266
[58] Field of Search ............... 358/256, 280, 285, 293, 358/294; 350/266

[56] References Cited

U.S. PATENT DOCUMENTS

| | | |
|---|---|---|
| 2,961,696 | 10/1954 | Yule . |
| 4,268,870 | 5/1981 | Kitamura et al. ............... 358/293 |
| 4,279,003 | 7/1981 | Schulz ............................ 358/280 |
| 4,484,232 | 11/1984 | Gast ............................... 358/284 |
| 4,516,175 | 5/1988 | Jung et al. ....................... 358/293 |

FOREIGN PATENT DOCUMENTS

| | | |
|---|---|---|
| 0077410 | 10/1981 | European Pat. Off. . |
| 615177 | 6/1935 | Fed. Rep. of Germany . |
| 2113966 | 3/1971 | Fed. Rep. of Germany . |
| 2805237 | 6/1979 | Fed. Rep. of Germany . |

*Primary Examiner*—Edward L. Coles, Sr.
*Attorney, Agent, or Firm*—Hill, Van Santen, Steadman & Simpson

[57] ABSTRACT

Diaphragm arrangement for point-by-point electro-optical scanning of originals, whereby the scan point is composed of a central main field and of a surrounding field surrounding the main field. A diaphragm for scanning the main field and a second diaphragm for scanning the surrounding field are provided, whereby the sizes of the diaphragm apertures of the two diaphragms are continuously adjustable independently of one another, whereby the diaphragm apertures of the first diaphragm define the size of the main field and, thus, the scanning fineness and the inside diameter of the surrounding field, and the diaphragm aperture of the second diaphragm defines the size of the surrounding field, and whereby the size relationship between main field and surrounding field is continuously adjustable on the basis of the independent and continuous adjustment of the two diaphragm apertures.

12 Claims, 3 Drawing Sheets

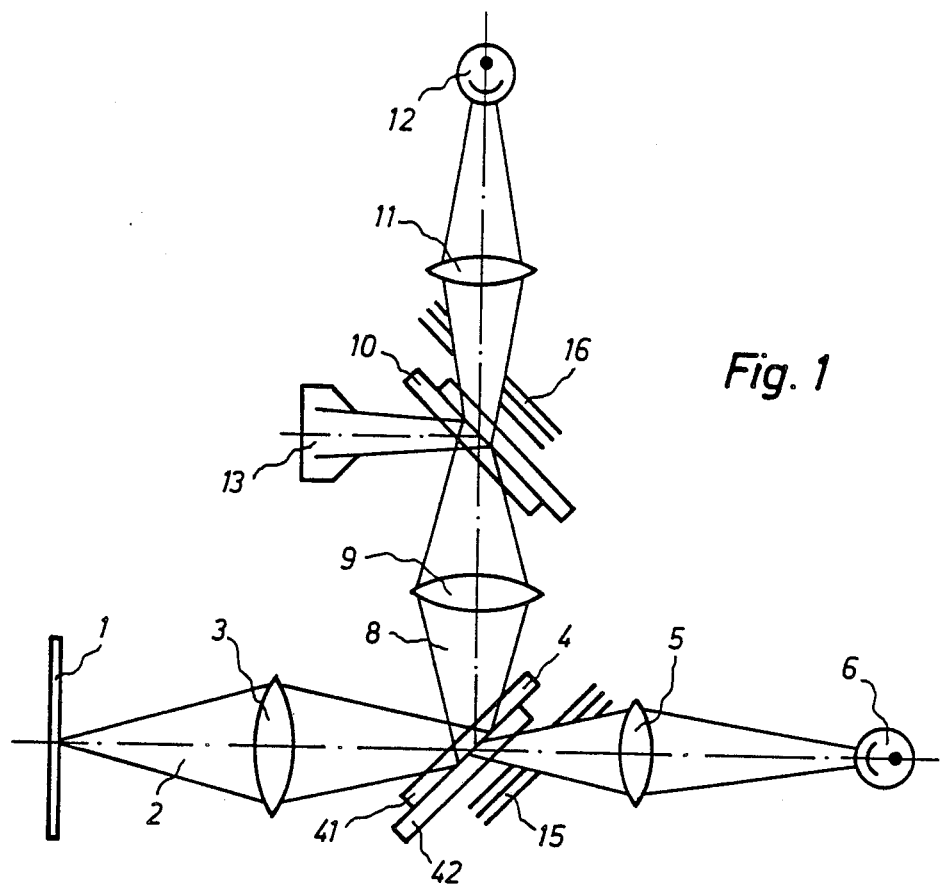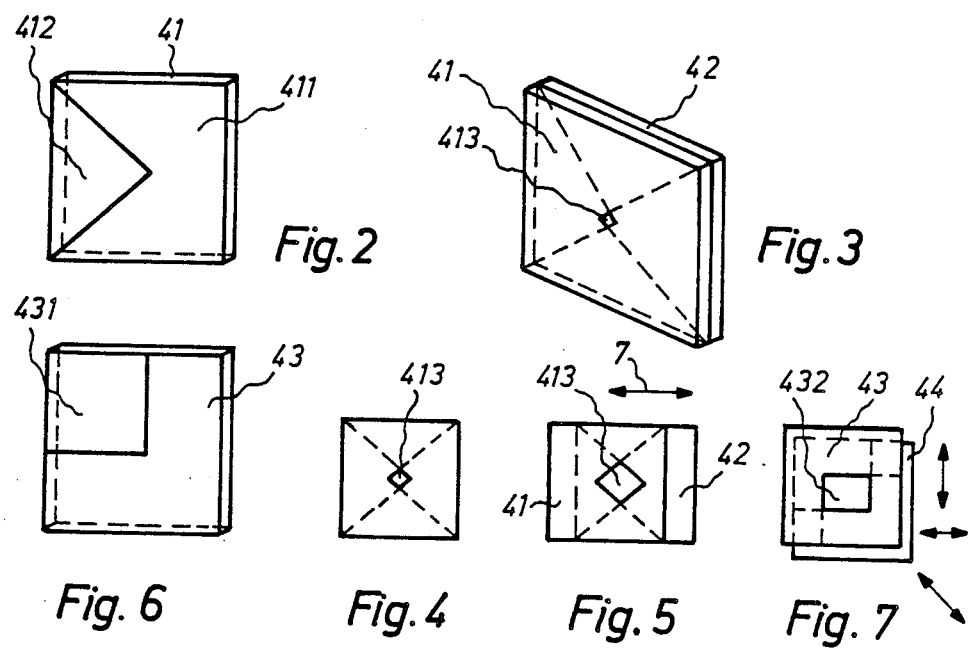

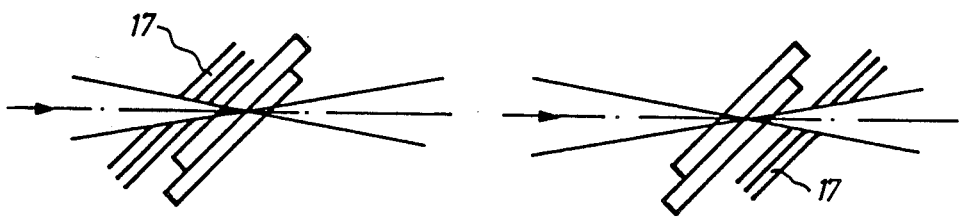
Fig. 8      Fig. 9
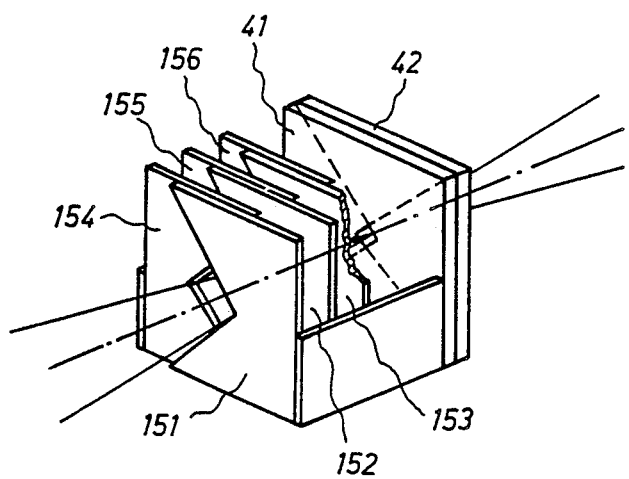
Fig. 10
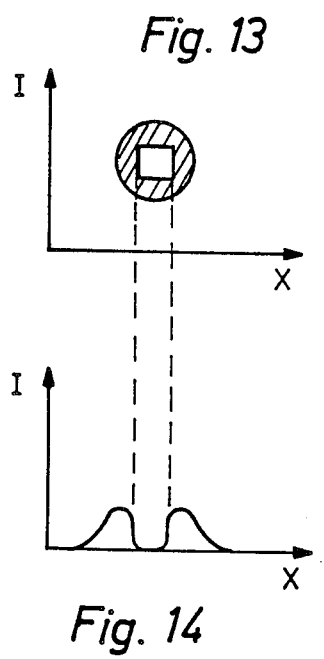
Fig. 13
Fig. 14

DIAPHRAGM ARRANGEMENT FOR OPTO-ELECTRONIC SCANNING OF ORIGINALS

BACKGROUND OF THE INVENTION

1. Field of the Invention

The present invention is directed to a diaphragm arrangement for opto-electronic scanning of originals according to the preamble of claim 1.

2. Description of the Related Art

In opto-electronic scanning of originals as employed, for example, in reproduction technology in what are referred to as scanners, an original is scanned point-by-point and line-by-line, whether opaquely or in transparency. The scanning light ray is forwarded via a diaphragm arrangement onto one or more optoelectronic transducers at whose output the image signals appear in analog form. Such scanners are used in reproduction for scanning black-and-white originals or chromatic originals, whereby either color separations for multi-color printing (chromatic printing) or color images are produced in color reproduction.

U.S. Pat. No. 2,691,696 shows a number of embodiments of such apparatus. In order to improve the image sharpness, what is referred to as "unsharp masking" is used in this patent, whereby a sharp and an unsharp scanning of the image are undertaken and the image signals thereby acquired are electronically united to form a recording signal.

In an embodiment disclosed by U.S. Pat. No. 2,691,696, two light sources are used at the scanning side for contrast enhancement (unsharp masking), whereby the one light source is provided for the sharp scanning (sharp channel) and the second light source is provided for the unsharp scanning (unsharp channel). The size of the sharp scanning spot and of the unsharp scanning spot is respectively defined by the aperture of two diaphragms that are respectively arranged in the corresponding light rays before the light rays impinge the scan location of the original. The signal separation of sharp signal and unsharp signal is undertaken either by separate opto-electronic transducers or mechanically (light chopper).

In another embodiment of U.S. Pat. No. 2,691,696 (FIG. 15), only one light ray and only one opto-electronic transducer are used at the scan side. Before the light impinges the scanning original, the light source is imaged with two optics onto two dynamically operating light valves arranged at a distance from one another. These light valves are electrically controllable and generate a variable light slit whose width depends on the electrically controlled signal. The light valves that are respectively arranged in the focal points of the optics lie at a right angle relative to one another and their interaction yields a quadratic or rectangular aperture that is imaged with a third optics onto the scan location of the original. The light the original allows to pass proceeds onto an opto-electronic transducer whose output signal is alternately switched onto two signal channels in a defined clock. The two light valves are likewise controlled such with this switching clock that the slit widths respectively assume two values in alternation, namely narrow or broad. When both light valves are at "narrow", then the transducer outputs an electrical signal for the sharp scanning (sharp channel); when both light valves are at "broad", then the signal for the unsharp scanning (unsharp channel) is taken at the transducer.

A sharp signal and, respectively, unsharp signal can in fact be alternately acquired in chronological succession with such an arrangement; however, the light valves are relatively slow, this leading to a low scanning rate.

Since, however, high scanning speeds are a matter of concern in such scanners, it is necessary that both the sharp signal as well as the unsharp signal are constantly adjacent without interruption, for which reason these scanning units having chronologically interrupted scan signals of low frequency have not prevailed in practice.

Scanner arrangements comprising diaphragm arrangements have therefore been utilized that work with high scanning frequency and wherein the scan signals are supplied without interruption. Such diaphragm arrangements that have been utilized both for the unsharp masking as well as for scanning originals that are already screened comprise a first diaphragm, also referred to as main diaphragm, that is arranged within the scanning light beam reflected by the original or allowed to pass by the original. The aperture of this diaphragm allows a central region of the scanning light beam to pass (main field), this being forwarded onto a first opto-electronic transducer that supplies the actual scanning image signal in the scanning spot.

A second diaphragm having a larger diaphragm aperture than the main diaphragm (also referred to as surrounding field diaphragm) is also provided, this extracting a sub-beam from the scanning light beam in combination with a partially transmitting mirror. A larger region of the original surrounding the sharp scanning spot, the size thereof being defined by the aperture of this surrounding field diaphragm, is extracted by this diaphragm and is forwarded onto a second opto-electronic transducer that supplies what is referred to as the surrounding field signal.

German Pat. No. 30 10 880 shows such a diaphragm arrangement wherein that side of the main diaphragm facing toward the scanning light beam comprises a mirroring in the region of the diaphragm aperture, a part of the scanning light beam (surrounding field) being mirrored out by this mirroring and being forwarded onto the second photo-electrical transducer via the surrounding field diaphragm. The surrounding field signal is electronically further-processed together with the main signal, this being disclosed, for example, in German Pat. No. 10 39 842.

The advantage of this diaphragm arrangement for scanning originals lies therein that, in comparison to U.S. Pat. No. 2,691,696, the scan signals of the main field and surrounding field are constantly supplied in parallel, this allowing a fast scanning and signal processing. Further, an exact separation of main field signal and surrounding field signal is established, this not being the case in U.S. Pat. No. 2,691,696. In the U.S. Patent, the signal of the sharp channel corresponds to the main field signal of German Pat. No. 30 10 880, but the signal of the unsharp channel does not correspond to the surrounding field signal; rather, the unsharp signal also contains the modulation of the sharp, main picture element since the diaphragm in the unsharp channel merely scans a larger spot than the diaphragm in the sharp channel.

The surrounding field signal that is supplied by the reflecting diaphragm of German Pat. No. 30 10 880 contains only the signal components of the surrounding field surrounding the sharp picture element.

Since it is not only the unsharp masking or, when scanning rastered originals, a de-rastering that is to be undertaken with the diaphragm arrangement in such scanners but there is usually also the demand for modification of the reproduction scale between original and recording, it is necessary to undertake the scanning with different scanning fineness depending on the scale, to which end the size of the scan spot, i.e. of the diameter of the main diaphragm, as well as the outer limitation of the surrounding field by the aperture of the surrounding field diaphragm must be adapted to the scanning fineness dependent on the scanning fineness selected.

It would be fundamentally possible to undertake this adaptation with the light valves of U.S. Pat. No. 2,691,696; however, as already mentioned, a low scanning frequency, i.e. slow scanning, would have to be accepted. On the other hand, a clean signal separation between scanning spot and the signal that derives from the surrounding field surrounding the scanning spot would not be obtained.

Moreover, the utilization of such light valves of U.S. Pat. No. 2,691,696 in an arrangement of German Pat. No. 30 10 880 is not possible since such a light valve enables a different adjustment of a light slit in only one dimension and two such light valves cannot be spatially arranged at one location. We would like to reference U.S. Pat. No. 3,646,262 in this context wherein such a light valve is shown in FIGS. 10 through 12.

A further disadvantage of such light valves is comprised therein that it is not possible to separately extract the surrounding field with such light valves.

Adjustable diaphragms, for example iris diaphragms that are composed of a plurality of lamellae are also known, these being correspondingly turned or, respectively, displaced for the adjustment of the diaphragm. The utilization of such diaphragms in a diaphragm arrangement of German Pat. No. 30 10 880 is likewise not possible since, even if the back side of the lamellae is mirrored, a planar mirror cannot be produced with which an exact optical imaging is possible. One reason lies in the differing thickness of the lamellae and in the fact that the lamella thicknesses cannot be arbitrarily reduced for obtaining the required, mechanical stiffness. Further, the flexibility of the lamellae prevents an exact optical imaging. These diaphragms are thus eliminated for utilization as reflecting diaphragms.

For adapting the diaphragm diameter to the different scanning finenesses, a plurality of diaphragms differing in diameter and allocated to one another are therefore used in practice, these, for example, being arranged in what is referred to as a diaphragm wheel. Dependent on the scanning fineness selected, two different diaphragms adapted to one another are swivelled into the scanning light beam. Since, however, there is only one optimum main diaphragm diameter for every scanning fineness, this determining the size of the scanning light spot, it is clear that an optimum scanning can only ensue for these individual diaphragms even given a plurality of diaphragms. A mismatch of the diaphragm is established for scanning finenesses that lie between these diaphragm diameters and this must in fact be accepted. A loss of contrast occurs given too large a diaphragm (over-scanning) and scanning gaps occur given too small a diaphragm (under-scanning). An information loss, i.e. a quality loss, is unavoidable in both cases. An apparatus that is provided with such a diaphragm wheel is described, for example, in the operating instruction, Vario-Klischograph K 181, Edition 3, December 1963, of Dr.-Ing. Rudolf Hell GmbH, Kiel.

In order to counteract the disadvantages occurring upon utilization of diaphragm wheels EP-A-1 0 077 410 recites a method for improving the contrast enhancement given variable reproduction scale wherein a designational modification of the transmission width of correction signal (surrounding field signal) and image signal (main field signal) is set dependent on the scale selected. This in fact makes an electronic attempt to undertake a matching of the contrast enhancement to the different scanning resolution; however, an optimum diaphragm adaptation of both the main diaphragm as well as of the surrounding field diaphragm does not occur, so that over-scanning or, respectively, under-scanning also occur here.

As may be seen therefrom, one must therefore fundamentally count on a quality decrease given scanning finenesses that are not optimized to the respective diaphragm diameter.

When rastered originals are scanned, a residual moire occurs in addition to a quality decrease since filtering the raster frequency of the raster of the rastered original out can likewise ensue only with diaphragm diameters optimally adapted to the raster of the original, this being disclosed, for example, by EP-A-2 0 065 281.

SUMMARY OF THE INVENTION

The present invention is therefore based on the object of creating a diaphragm arrangement for opto-electronic scanning of originals wherein these disadvantages are to be avoided. The diaphragm arrangement should both be matched to the respectively required scanning fineness as well as lead to an optimum derastering of the diaphragm when scanning rastered originals and should thereby supply a high scanning speed and a clean signal separation of the main field and surrounding field.

The invention achieves this by the features recited in the characterizing part of claim 1.

Further advantageous developments of the invention are recited in sub-claims 2 through 7. The invention shall be set forth in greater detail below with reference to FIGS. 1 through 15. Shown are:

BRIEF DESCRIPTION OF THE DRAWINGS

FIG. 1 an adjustable diaphragm arrangement for scanning main field and surrounding field;

FIG. 2 an embodiment of an element of an adjustable diaphragm;

FIG. 3 a perspective view of two cooperating diaphragm elements;

FIG. 4 an example of the shape of the aperture of the diaphragm of FIG. 3;

FIG. 5 a further example of the shape of the diaphragm aperture after adjustment of the diaphragm;

FIG. 6 a further exemplary embodiment of a diaphragm element;

FIG. 7 an example of the shape of the aperture given employment of the diaphragm element of FIG. 6;

FIG. 8 an example of the arrangement of additional, adjustable stray light diaphragms in front of the adjustable diaphragm;

FIG. 9 an example of the arrangement of additional, adjustable stray light diaphragms following the adjustable diaphragm;

FIG. 10 a perspective view of a combination of adjustable diaphragm with adjustable stray light diaphragms;

FIG. 13 an illustration of the shape of the surrounding field given employment of an iris diaphragm;

FIG. 14 the curve of the radiant intensity for the surrounding field according to FIG. 14 along a section;

DESCRIPTION OF THE PREFERRED EMBODIMENTS

Figure 11:
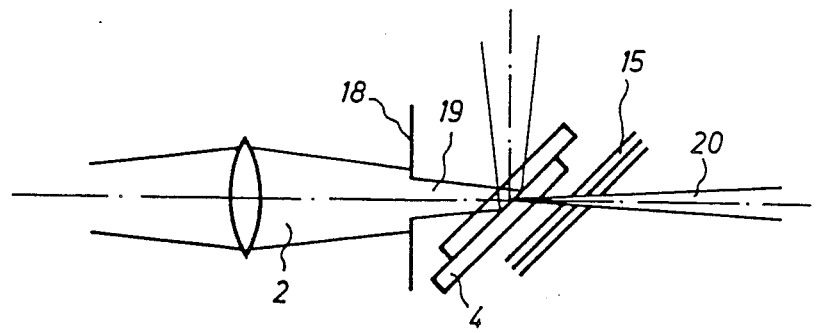
FIG. 11 a further example of a diaphragm arrangement wherein the diaphragm for the surrounding field is an iris diaphragm that lies on an axis with the diaphragm of the main field.

FIG. 1 shows a scanner arrangement for an original 1 wherein a scanning light beam 2 that can be either a light beam allowed to pass by the original 1 or a light beam reflected by the original is forwarded onto an opto-electronic transducer 6 via a schematically illustrated optics 3, a diaphragm 4 and a further optics 5. The diaphragm 4 is composed of two plane-parallel glass plates 41 and 42 that are obliquely arranged in the scanning light beam 2.

FIG. 2 shows such a plate 41 that is provided at one side with a reflecting layer 411 that only covers a part of the plate 41. In that the plate is only partly coated, it allows light to pass in the part referenced 412. When two such plates that have their mirrored layer lying adjacent to one another are joined, then a diaphragm having a symmetrical aperture 413 as shown in FIGS. 3 and 4 arises. When the plates 41 and 42 are displaced in arrow direction 7 according to FIG. 5, then the size of the diaphragm aperture changes.

In order to obtain a better optical behavior of the diaphragms, the non-coated areas are advantageously anti-reflection coated by applying a dielectric layer. The coating of the glass plates ensues by metallic vapor-deposition having layer thicknesses in the region of about 0.1 μm. The spacing of the glass plates amounts to about 5 μm and can be further reduced when the plates are optically polished. Such a diaphragm arrangement supplies exact optical imagings since the layer thickness of the coating is negligible.

The reflecting layer 411 surrounding the aperture 413 reflects a sub-beam 8 that is forwarded via a further optics 9 onto a diaphragm 10 that can be constructed in the same way as the diaphragm 4. The light allowed to pass through the diaphragm 10 proceeds via a further optics 11 onto an opto-electronic transducer 12. The diaphragms 4 and 10 are set such that the diaphragm 4 limits the diameter of the main beam and the diaphragm 10 limits the diameter of the surrounding field beam. The light that the diaphragm 10 does not allow to pass is reflected and is diverted into a light sump 13.

FIG. 6 shows a further embodiment of a coated glass plate 43 and FIG. 7 shows an arrangement of two such glass plates 43 and 44 that likewise yield an adjustable diaphragm. A symmetrical diaphragm aperture 432 is likewise formed by displacement of the individual glass plates in diagonal direction.

This diaphragm arrangement according to FIGS. 2 and 7 allows unaltered diaphragm shapes such as symmetrical quadrilaterals, lozenges, squares and rectangles having arbitrary edge ratios to be realized. The mechanical relative motion is dimensioned defined such that the center point of the diaphragm aperture is always situated at the same location. This is achieved in that, for example, lever systems having spindle drive or sine drive are utilized or the movement of an endless belt is exploited.

A further improvement of the scanning system of FIG. 1 can advantageously be composed of an additional stray light blanking. The contrast conditions in the scanning are to be improved as a result thereof. This goal is achieved in that what are referred to as beam traps are used as stray light diaphragms, these being adapted to the respective aperture of the light beam. In FIG. 1, beam traps 15 and 16 that are shown in detail in FIGS. 8 and 9 can be provided for this purpose, for example following the diaphragm 4 as well as the diaphragm 10. Advantageously, they are composed of matte black lamellae 17 that are rigidly connected to the diaphragm elements and can be comoved together with the diaphragm elements. However, the stray light diaphragms can also be arranged preceding the diaphragms in the beam path; this depends on where disturbing stray light is incident and may also depend upon where appropriate space for these diaphragms is present within the system.

FIG. 10 shows a perspective view of such a beam trap in combination with an adjustable diaphragm of FIG. 3.

Individual lamellae 151, 152 and 153 are secured to the diaphragm element 41, these individual lamellae interacting with lamellae 154, 155 and 156 arranged on the diaphragm element 42. The cut-outs of the individual lamellae are dimensioned such that they are adapted to the respective beam diameter.

When the reflected sub-beam for an unsharp masking is to be used in the scanning of the originals, then it is recommendable to provide the arrangement of stray light diaphragms following the diaphragm 10, as shown in FIG. 1.

FIG. 11 shows a further embodiment of the invention. The scan beam 2 is thereby limited by an adjustable iris diaphragm 18. The limited light beam 19 impinges the adjustable main diaphragm 4 that only allows a sub-beam 20 to pass, whereas the remaining light is reflected by the mirroring of the diaphragm.

Figure 12:
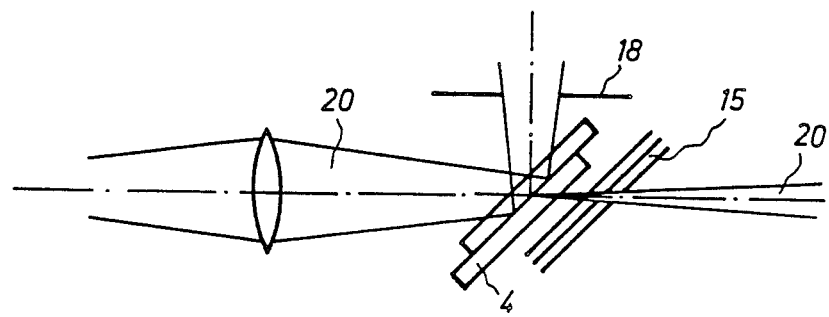
FIG. 12 a further example of a diaphragm arrangement wherein the diaphragm for the surrounding field is an iris diaphragm and lies on the extracted axis for the surrounding field.

The iris diaphragm 18 can also be arranged in the sub-beam reflected by the main diaphragm 4, this being shown in FIG. 12. When the contrast demands are not all too high, then the iris diaphragm 18 in the arrangement shown in FIG. 11 can likewise assume the function of the stray light diaphragm and the lamellae diaphragm 15 of FIG. 11 can be omitted. A special property of these arrangements of FIGS. 11 and 12 is that the limitation of the surrounding field beam is unsharp, this being shown in FIGS. 13 and 14. FIG. 13 shows the shape of the extracted surrounding field and FIG. 14 shows the intensity curve I over the diameter of the diaphragm in direction x of FIG. 13.

Figure 15:
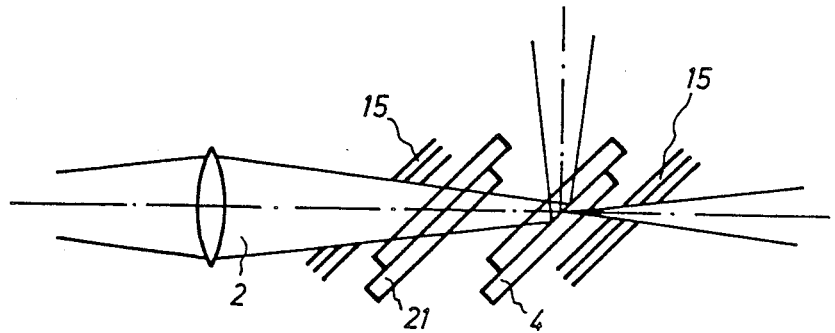
FIG. 15 a further example of a diaphragm arrangement wherein identical diaphragms for the main field and for the surrounding field lie on an axis.

FIG. 15 shows a further embodiment of the invention wherein a second adjustable diaphragm 21 is utilized instead of the iris diaphragm. In order to keep the spacing of the diaphragms 21 and 4 from becmmming all too great, the diaphragms are turned such that the stray light diaphragms 15 come to lie in front of the diaphragm in one instance and behind the diaphragm in another instance. As in FIG. 12, the surrounding field diaphragm can also be arranged in the reflected beam.

Given the diaphragm arrangements described in the embodiments of FIGS. 1, 11, 12 and 15, the beam splitting is undertaken with the mirroring of the diaphragm.

A further advantageous diaphragm arrangement is established when the beam splitting is undertaken with a splitter cube. In this case, it is not necessary that the coating of the diaphragm members be executed in reflective fashion since the splitter cube extracts the beam. Such a splitter cube has not been illustrated since these splitter cubes are notoriously known as optical components.

Given employment of the diaphragm arrangement of the invention for unsharp masking wherein a sub-beam is extracted from the scanning light, the size of the surrounding field diaphragm can be selected dependent on how pronounced this effect should be. It can be between 1.3 through 5 or even up to 20 times greater than the main diaphragm in individual cases. A special demand made of shape and size of the scan diaphragm is established when rastered originals are to be scanned. It is thereby necessary that the shape of the diaphragm and the squaring of the diaphragm aperture are adapted to the scanned raster. EP-A-2 0 065 281 is referenced in this respect. Since the scanned originals frequently have greatly differing raster widths when scanning rastered originals and the screening angles in the individual color separations are also different, the diaphragm arrangement of the present invention is especially suitable for undertaking these adaptations. By being turned around the optical axis, the main diaphragm has its edges set to the screening angle and the diaphragm size is set to the size of the raster mesh. Size and direction of the surrounding field diaphragm are likewise optimized.

We claim:

1. A diaphragm arrangement for point-by-point, opto-electronic scanning of originals, whereby the scan point is composed of a central main field and of a surrounding field surrounding the main field, comprising a first diaphragm for scanning the main field, this first diaphragm being arranged within a scanning light beam reflected by the original or allowed to pass by the original and comprising a mirroring in the region around the diaphragm aperture at that side facing toward the scanning light beam, this mirroring reflecting a part of the scanning light beam, and comprising a second diaphragm for scanning the surrounding field, this second diaphragm being arranged within the part of the scanning light beam reflected by the first diaphragm, characterized in that the size of the diaphragm apertures of the two diaphragms are continuously adjustable independently of one another, whereby the diaphragm aperture of the first diaphragm defines the size of the main field and, thus, the scanning fineness and defines the inside diameter of the surrounding field, and the diaphragm aperture of the second diaphragm defines the size of the surrounding field, and whereby the size relationship between main field and surrounding field is continuously adjustable by independent adjustment of the two diaphragm apertures.

2. A diaphragm arrangement according to claim 1, characterized in that each of the diaphragms are composed of two mirrored diaphragm elements that comprise symmetrical recesses of the mirroring and that are arranged such that the recesses supplement one another to form the diaphragm aperture.

3. A diaphragm arrangement according to claim 2, characterized in that the adjustment of the diaphragm aperture ensues by symmetrical displacement of the diaphragm elements.

4. A diaphragm arrangement according to claims 1 or 2 or 3, characterized in that each of the diaphragms is composed of two plates of glass or the like lying on one another, each of these plates comprising a mirrored surface; in that these plates have their mirrored surface lying on top of one another; and in that symmetrical, non-mirrored areas are recessed within the mirroring, being recessed such that, given plane-parallel displacement of the two plates along at least one of the symmetry axes of the non-mirrored surfaces, continuously variable diaphragm apertures are produced by these non-mirrored surfaces.

5. A diaphragm arrangement according to claims 1 or 2 or 3, characterized in that the mirroring of the diaphragm elements is a metallic vapor-deposition.

6. A diaphragm arrangement according to claim 4, characterized in that the glass plates are optically polished.

7. A diaphragm arrangement according to claim 4, characterized in that the non-mirrored parts of the glass plates are anti-reflection coated.

8. A diaphragm arrangement according to claims 1 or 2 or 3, characterized in that, for symmetrical displacement of the diaphragm elements, a relative motion in the form of an oppositely directed translational motion is generated such that the center point of the diaphragm aperture is preserved.

9. A diaphragm arrangement according to claims 1 or 2 or 3, characterized in that additional diaphragms whose apertures are respectively matched to the aperture of the ray beam at the location of the auxiliary diaphragm are arranged preceding or following the adjustable diaphragms for the suppression of stray light.

10. A diaphragm arrangement according to claim 9, characterized in that the additional diaphragms are composed of matte black lamellae that are rigidly connected to the diaphragm elements; and in that these lamellae are displaceable together with the diaphragm elements.

11. A diaphragm arrangement according to claims 1 or 2 or 3, characterized in that the diaphragm apertures are symmetrical quadrilaterals, lozenges, squares or rectangles having arbitrary edge ratio.

12. A diaphragm arrangement according to claim 1, characterized in that the second diaphragm is an iris diaphragm.

* * * * *